3,337,512
PRODUCT AND PROCESS FOR PREPARING POLY(2,6-XYLYLSULFONATES)
Walter L. Hall, Schenectady, N.Y., assignor to General Electric Company, a corporation of New York
No Drawing. Filed Feb. 1, 1965, Ser. No. 429,652
4 Claims. (Cl. 260—79.3)

This invention relates to the new chemical compounds, 2,6-xylenol-3-sulfonyl chloride and 2,6-xylenol-4-sulfonyl chloride, mixtures thereof and to polymers produced by the self-condensation of these compounds whereby the sulfonyl chloride of one molecule reacts with the hydroxyl group of another molecule splitting off hydrogen chloride and forming a poly(2,6-xylylsulfonate). The above new chemical compounds are the subject matter of my divisional application Ser. No. 631,849, filed Apr. 19, 1967, and assigned to the same assignee as the present invention.

Polymeric aromatic sulfonates have been prepared by the reaction of a biphenol and an aromatic disulfonyl halide. In this reaction, in order to obtain high molecular weight products, it is necessary to carry out the reaction in a two-phase reaction in which the aromatic disulfonyl chloride is in an organic phase and the diphenol is dissolved in an aqueous phase with alkali. It is further necessary that equal molar amounts of the two reactants be used to obtain high molecular weight products. Insofar as I am able to ascertain, no one has ever been able to make high molecular weight products by the self-condensation of an aromatic compound which contains both a phenolic group and a sulfonyl chloride group as substituents on the same aryl ring. This may well be due to the fact that the chlorosulfonation of phenols generally leads to a mixture of compounds which is not easily separated. Even those few phenolsulfonylchlorides which can be made, for example, 2,6-dichlorophenol-4-sulfonyl chloride, if they form polymers at all, form only low molecular weight apparently cyclic compounds which can not be reacted further to form high molecular weight polymers.

I have now found that 2,6-xylenol, also named 2,6-dimethylphenol, can be readily chlorosulfonated with chlorosulfonic acid to produce a mixture of 2,6-xylenol-4-sulfonyl chloride and 2,6-xylenol-3-sulfonyl chloride. This mixture of compounds can be used as prepared or the mixture of the two compounds can be readily separated into the two isomers prior to making the polymeric condensation product. These two isomeric 2,6-xylenolsulfonyl chlorides can also be readily produced by reacting the corresponding sulfonic acids with a chlorinating agent such as thionyl chloride. These two 2,6-xylenolsulfonyl chlorides have never been prepared before insofar as I can determine. I have found further that these two compounds when dissolved in an organic solvent, will condense with themselves or each other, under anhydrous conditions in the presence of a hydrogen halide acceptor, to form high molecular weight essentially liner poly(2,6-xylylsulfonates). These polymers are likewise new compositions of matter which have many valuable properties. For example, they are extremely resistant to alkalis and acids. They can be shaped or molded into useful fabricated shapes or they can be cast into films or drawn into fibers.

In order to obtain the desired high molecular weight polymers, it is essential that the organic solvent is a solvent for both the starting xylenolsulfonyl chloride and the final polymeric product. Although I can prepare the two isomeric 2,6-dichlorophenolsulfonyl chlorides in the same way that I can form the two isomeric 2,6-xylenolsulfonyl chlorides, I have found that self-condensation of these chlorophenolsulfonyl chlorides leads only to the formation of low molecular weight, brittle, cyclic polymers which are completely unsatisfactory for the making of useful, shaped, polymeric products. Unfortunately, the cyclic materials cannot be further polymerized to higher molecular weight polymers by any known means.

The best method for preparing 2,6-xylenol-4-sulfonyl chloride is by sulfonation of 2,6-xylenol to form 2,6-xylenol-4-sulfonic acid which is isolated in the form of its alkali metal salt, for example, the sodium salt, following the procedure described by P. Karrer and P. Leiser, in Helv. Chim. Acta 27, 678 (1944). The reaction if the sodium salt of 2,6-xylenol-4-sulfonic acid with thionyl chloride readily converts the sodium salt to the corresponding 2,6-xylenol-4-sulfonyl chloride, free of any of the 2,6-xylenol-3-sulfonyl chloride iosmer.

The method of preparing 2,6-xylenol-3-sulfonyl chloride is as a mixture with 2,6-xylenol-4-sulfonyl chloride followed by separation of the isomers. I have determined that when 2,6-xylenol is chlorosulfonated that the product is a mixture of approximately 85 mole percent 2,6-xylenol-3-sulfonyl chloride and 15 mole percent 2,6-xylenol-4-sulfonyl chloride. This mixture can be used as such or it can be separated to isolate the 2,6-xylenol-3-sulfonyl chloride, by fractional crystallization and sublimation from the other isomer.

Fin forming the polymers from these materials, an organic solvent is used which is a solvent for both the 2,6-xylenolsulfonyl chloride and the poly(2,6-xylyl sulfonate). These solvents, of course, should be nonreactive with the sulfonyl chloride and phenolic hydroxyl groups, and should be capable of being made anhydrous. Typical solvents which are satisfactory are tetrahydrofuran, tetrachloroethane, nitrobenzene, etc. As long as the solvent meets the requirements of solubility for both the starting and final product, and can be made anhydrous. Any organic solvent is satisfactory. Of the various solvents I have tried, nitrobenzene is the preferred solvent and leads to the highest molecular weight products.

These 2,6-xylenolsulfonyl chlorides when dissolved in solution are completely stable until a hydrogen halide acceptor is added. Since water must be excluded, this hydrogen halide acceptor should be one which is anhydrous and soluble in the reaction mixture. Examples of hydrogen halide acceptors which one may use are tertiary amines, for example, pyridine, lutidine, triethylamine, trimethylamine, cyclic tertiary amines, for example, triethylenediamine, etc., or the hydrogen halide acceptor may be an alkali, for example, butyl lithium or an alkali metal alcoholate which is soluble in the reaction mixture. Of the various hydrogen halide acceptors I have found that triethylenediamine is the most suitable.

In the presence of the hydrogen halide aceceptor the sulfonyl halide group of one molecule readily reacts with the hydroxyl group of another molecule to produce an essentially linear poly(2,6-xylylsulfonate) according to the following equation wherein the sulfur atom on one benzene ring is joined to the oxygen atom on the adjacent benzene ring of the polymer molecule.

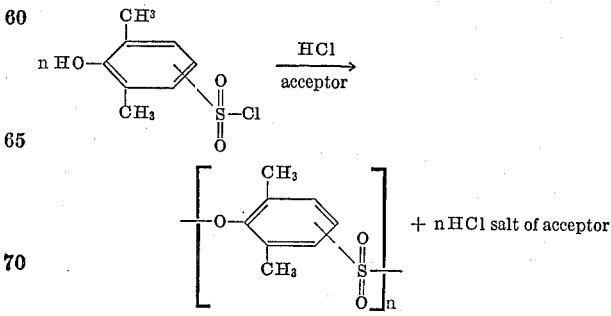

In the above equation, $n$ represents the number of molecules of 2,6-xylenolsulfonyl chloride which self-condense to form one molecule of the polymer. The actual number of molecules of the monomer in the polymer is not constant for each polymer molecule but is a distribution whose average number is known as the average degree of polymerization which multiplied by the molecular weight of the repeating unit, gives the number average molecular weight of the polymer. Since my polymers have film and fiber-forming properties, they have an average molecular weight of at least 10,000 and generally higher which would mean that $n$ is an average of at least 55 and generally is 100 or higher.

In order that those skilled in the art may better understand my invention, the following examples are given by way of illustration and not by way of limitation. In all the examples the percentages and parts are by weight unless specifically stated otherwise.

Example I

This example illustrates the preparation of a mixture of 2,6-xylenol-3-sulfonyl chloride and 2,6-xylenol-4-sulfonyl chloride, and the separation of 2,6-xylenol-3-sulfonyl chloride from this mixture. To a suspension of 50 g. of 2,6-xylenol in 50 ml. of carbon disulfide cooled to $-35°$ C., 300 g. of chlorosulfonic acid was added dropwise over a period of 35 minutes. The temperature of the reaction mixture was allowed to rise slowly over a period of 12 hours to room temperature where it was maintained for an additional 7 hours. The reaction mixture was added cautiously to 1000 g. of ice. After the ice melted, the precipitate was isolated by filtration. After washing several times with distilled water, the precipitate was vacuum dried at room temperature. The crude product weighed 30.9 g. The solid was extracted with hot ligroin and the insoluble material was recrystallized from hot mixture of 1 volume of toluene to 4 volumes of ligroin. Recrystallization a second time from the same solvent mixture yielded a white solid. The needle-like crystals, which were isolated, were vacuum dried and sublimed at 52° C. under 5 microns pressure. The white sublimed solid had a melting point of 90° C. Elemental analysis showed the material to be 43.7% C, 4.1% H, and 15.8% Cl, which is in agreement with the calculated values of 43.5% C, 4.1% H, and 16.1% Cl. The molecular weight as determined by the Mechrolab osmometer was $219\pm5\%$ using chloroform as the solvent. Both the NMR and IR spectra were in accordance with the chlorosulfonyl group being in the 3-position adjacent to the methyl group. All these data show that the product was 2,6-xylenol-3-sulfonyl chloride.

The NMR spectrum showed the presence of two different methyl groups at $2.3\delta$ and $2.6\delta$ in the ratio of 1 to 1 and an AB pattern for 2 aromatic hydrogen atoms between $7.0\delta$ and $7.7\delta$. The phenolic proton appeared at $5.1\delta$. The infrared spectrum showed two strong bands at 810 and 860 cm.$^{-1}$ characteristic of 1, 2, 3, 4 benzene ring substitution, which is the order of substitution in 2,6-xylenol-3-sulfonyl chloride if numbering is started at the methyl group in the 6-position.

Example II

This example illustrates the preparation of 2,6-xylenol-4-sulfonyl chloride. Sodium 2,6-xylenol-4-sulfonate was prepared by the method of Karrer and Leiser, (previously referenced). A solution of 22.4 g. of the sodium salt in 40 ml. of dimethylformamide was cooled to 0° C. To this solution 33.0 g. of thionyl chloride was added dropwise over a 10 minute period. The cooling bath was removed whereupon the temperature rose to 39° C. due to the exothermic nature of reaction. After a total reaction time of 52 minutes, the reaction mixture was added cautiously to 100 g. of ice. After the ice melted, the white solid which formed was isolated by filtration and washed several times with distilled water. After vacuum drying at room temperature, the isolated solid which weighed 19.8 g. was dissolved in a minimum amount of toluene and the solution dried with anhydrous sodium sulfate. An approximately equal volume of n-hexane was added to the dried solution. The solution was then cooled to 0° C. The crystals which formed, were isolated by filtration and vacuum dried to yield 13.5 g. of product which had a melting point of $135\pm1°$ C.

Elemental analysis showed that the product had 43.6% C, 4.1% H and 16.1% Cl in good agreement with the calculated values of 43.5% C, 4.1% H and 16.1% Cl. Both the NMR and IR spectra were in accord with chlorosulfonyl group being in the 4-position. All these data show that the product was 2,6-xylenol-4-sulfonyl chloride.

The NMR spectrum show 1 methyl hydrogen peak at $2.4\delta$, a single aromatic hydrogen peak at $7.1\delta$ and a phenolic proton a $5.7\delta$ in the ratios of 6 to 2 to 1. The infrared spectrum showed a strong band at 900 cm.$^{-1}$ characteristic of 1, 2, 3, 5 benzene substitution which is the order of substitution in 2,6-xylenol-4-sulfonyl chloride when numbering is started from the methyl group in the 6-position

Example III

This example illustrates the polymerization of 2,6-xylenol-4-sulfonyl chloride to poly(2,6-xylyl-4-sulfonate). A solution of 9.2 g. of 2,6-xylenol-4-sulfonyl chloride dissolved in 20 ml. of dry nitrobenzene was maintained under nitrogen atmosphere. To this solution, a solution of 6.6 g. of triethylenediamine in 20 ml. of nitrobenzene was added over a 15 minute period. The reaction was allowed to proceed at room temperature for 15 hours. The reaction mixture was poured into ethyl ether to precipitate the polymer which was washed with water and ether and then vacuum dried. The yield of 6.7 g. corresponded to a 90% conversion of 2,6-xylenol-4-sulfonyl chloride to poly(2,6-xylyl-4-sulfonate). The polymer was extracted with approximately 200 ml. of acetone to remove low molecular weight polymer and unreacted monomers. Analysis of the acetone insoluble polymer showed 51.9% C, 4.5% H and 15.9% S which compares very favorably with the calculated values of 51.6% C, 4.3% H and 17.2% S. The intrinsic viscosity of this polymer measured in nitrobenzene at 25° C. is 0.57. The polymer was pressed into a film at 260° C. and quenched in ice water to prevent crystallization. Samples of the resulting flexible, clear film showed no change when allowed to stand for two weeks at 90° C. in 0.5 N hydrochloric acid or 0.5 N potassium hydroxide. The X-ray analysis showed the film was amorphous. Crystallization of the film can be obtained by exposing it to a solvent such as acetone. The film can be cold-drawn in one or both directions to produce a molecularly oriented film. Likewise fibers can be drawn from solutions or melts of the polymer.

In the same way as described in Example III, the 2,6-xylenol-3-sulfonyl chloride and the mixture of 2,6-xylenol-3-sulfonyl chloride and 2,6-xylenol-4-sulfonyl chloride prepared in Example I, is polymerized to high molecular weight polymers having the properties similar to the 4-isomer but less crystalline in nature. The copolymer prepared from the mixture of 2,6-xylenol-3-sulfonyl chloride and 2,6-xylenol-4-sulfonyl chloride is noticeably less crystalline because of the random order of the two isomeric units in the polymer molecule.

The poly(2,6-xylyl-4-sulfonate), poly(2,6-xylyl-3-sulfonate), and copolymers of these two polymers of this invention have a wide variety of uses; as coating compositions they may be coated onto metallic or nonmetallic substrates, by flame spraying, melt casting, or by casting while dissolved in one of the solvents in which it is made, or other solvent in which it is soluble, and thereafter evaporating the solvent at an elevated temperature, and if desired, at reduced pressure. The hot solution of the solvent may be forced through a spinneret into a heated drying tower, preferably maintained at a reduced pressure, to form filaments or fibers, or the molten polymer may be forced through spinnerets by well known techniques to form filaments and fibers. The fibers so formed may be formed into yarns or used to form fiber matting. Alternatively, the poly(2,6-xylylsulfonates) may be cast from solution or from the melt of the polymer, extruded through a die or otherwise sheeted to form a continuous film of the polymers. The compositions may also be injection, transfer, or compression molded under heat and pressure to form intricately shaped objects of wide utility, dependent on the particular object molded. Other uses for these films and fabrics or mats made from the fibers include a wide variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated or bonded with the polymer, small condensers, metal foil laminated to the film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electro-luminescent structures, etc.

Other valuable uses for the poly(2,6-xylylsulfonates) of this invention will be readily apparent to those skilled in the art. Also, many apparently widely different embodiments such as the adding of pigments, fillers, stabilizers, plasticizers, etc., may be made to modify the properties of the poly(2,6-xylylsulfonates) without departing from the spirit and scope of the invention. It is therefore to be understood that changes may be made in the particular embodiments of the invention described which are within the full intended scope of the invention as defined by the appended claims.

What I claim as new and desire to secure by Letters Patent of the United States is:

1. An essentially linear polymer selected from the group consisting of poly(2,6-xylyl-3-sulfonate), having the structural formula

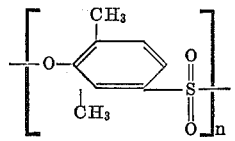

poly(2,6-xylyl-4-sulfonate), having the structural formula

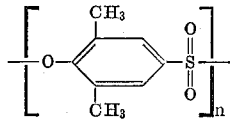

and copolymers consisting essentially of 2,6-xylyl-3-sulfonate and 2,6-xylyl-4-sulfonate structural units, said copolymers have the structural formula

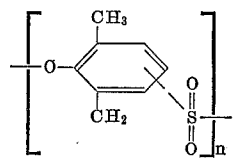

where $n$ is at least 55.

2. Essentially linear poly(2,6-xylyl-3-sulfonate), having the structural formula

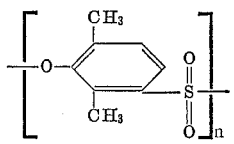

where $n$ is at least 55.

3. Essentially linear poly(2,6-xylyl-4-sulfonate), having the structural formula

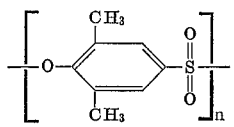

where $n$ is at least 55.

4. An essentially linear copolymer consisting essentially of 2,6-xylyl-4-sulfonate and 2,6-xylyl-3-sulfonate structural units said copolymer having the structural formula

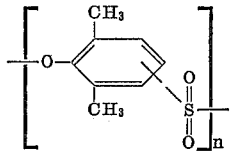

where $n$ is at least 55.

References Cited
FOREIGN PATENTS
830,822    3/1960    Great Britain.

JOSEPH L. SCHOFER, *Primary Examiner.*

D. K. DENENBERG, *Assistant Examiner.*